United States Patent [19]

Suzuki et al.

[11] Patent Number: 5,127,226
[45] Date of Patent: Jul. 7, 1992

[54] HYDRAULIC APPARATUS FOR INDUSTRIAL VEHICLE

[75] Inventors: Shigeru Suzuki; Kunifumi Goto; Wataru Minami, all of Kariya, Japan

[73] Assignee: Kabushiki Kaisha Toyoda Jidoshokki Seisakusho, Kariya, Japan

[21] Appl. No.: 706,867

[22] Filed: May 29, 1991

[30] Foreign Application Priority Data

Apr. 6, 1990 [JP] Japan .................. 2-145840

[51] Int. Cl.[5] .............................................. F16D 31/02
[52] U.S. Cl. .......................................... 60/420; 60/452; 91/514; 91/532; 417/222 R
[58] Field of Search .................. 60/420, 422, 426, 433, 60/434, 445, 450, 452; 91/511, 514, 518, 532; 417/222 R, 218

[56] References Cited

U.S. PATENT DOCUMENTS

| | | | |
|---|---|---|---|
| 4,011,721 | 3/1977 | Yip | 60/445 |
| 4,276,810 | 7/1981 | Zeuner et al. | 91/532 |
| 4,420,935 | 12/1983 | Kobald | 60/452 |
| 4,523,430 | 5/1985 | Masuda | 60/450 |
| 4,553,904 | 11/1985 | Ruseff et al. | 417/222 R |
| 4,938,023 | 7/1990 | Yoshino | 60/452 |
| 4,976,106 | 12/1990 | Noeskau et al. | 60/445 |

Primary Examiner—Edward K. Look
Assistant Examiner—Hoang Nguyen
Attorney, Agent, or Firm—Brooks Haidt Haffner & Delahunty

[57] ABSTRACT

A hydraulic apparatus for an industrial vehicle adapted for enabling to carry out a pump capacity control whenever necessary, and including a variable capacity type hydraulic pump driven by an engine, a flow dividing valve disposed in an outlet pipe line of the pump and adapted for dividing a flow of a pressurized hydraulic oil into a flow required for a power steering hydraulic circuit and a balance flow for a cargo handling hydraulic circuit, a switching valve pilot-operated by a pressure of the cargo handling hydraulic circuit and adapted for selecting a supply pilot pressure between a pressure of the power steering hydraulic circuit downstream with respect to the flow dividing valve and a pressure of the outlet pipe line upstream with respect to the flow dividing valve, and a capacity control valve pilot-operated by a differential pressure between the supply pilot pressure and the pressure of the outlet pipe line and adapted for controlling a capacity varying mechanism of the pump. The hydraulic apparatus can not only inhibit the power loss and improve the fuel consumption, but also it can inhibit the oil temperature from increasing very effectively.

12 Claims, 7 Drawing Sheets

HYDRAULIC APPARATUS FOR INDUSTRIAL VEHICLE

BACKGROUND OF THE INVENTION

1. Field of the Invention

The present invention relates to an hydraulic apparatus for an industrial vehicle such as a fork lift truck or the like. More particularly, the present invention relates to a hydraulic apparatus which is adapted for controlling a capacity of a hydraulic pump for cargo handling and power steering operations.

2. Description of Related Art

An ordinary hydraulic apparatus installed on a fork lift truck is provided with a flow dividing valve which is disposed in an outlet pipe line of a constant capacity type hydraulic pump operated by an engine. A flow of a pressurized hydraulic oil is divided by the flow dividing valve into a flow required for a power steering hydraulic circuit and a balance flow for a cargo handling hydraulic circuit, and the pressurized hydraulic oil supplied to the cargo handling hydraulic circuit is then supplied to either a lifting cylinder or a tilting cylinder by operating a cargo handling control valve whenever it is needed.

In the above-described conventional hydraulic apparatus, part of the pressurized hydraulic oil flow discharged from the constant capacity type hydraulic pump, namely, all of the flow other than the flow required for the power steering hydraulic circuit is supplied to the cargo handling hydraulic circuit. Hence, when the cargo handling operation is not under way, the pressurized hydraulic oil is returned to an oil tank as an excessive hydraulic oil simply passing through the cargo handling control valve. In addition, the discharge flow increases proportionally as the speed of the engine increases, and accordingly the circulation of the useless and excessive hydraulic oil is further accelerated. Therefore, the repeated circulation of the useless pressurized hydraulic oil leads to the power loss as well as the oil temperature increment, and it consequently causes the earlier degradation of sealing members and the like. Thus, the circulation of the useless pressurized hydraulic oil is one of the serious causes which makes the defects happen in the hydraulic apparatus.

The inventors of the present invention aimed at solving the problem, and proposed a hydraulic apparatus in advance in Japanese Patent Application No. 222331/1989 which is not laid-open at the time of this application. The hydraulic apparatus detects the revolution fluctuations of a pump driven by an engine, and detects whether the cargo handling operation is under way or not, whereby enabling an appropriate pump capacity control.

As illustrated in FIG. 7, the proposed hydraulic apparatus comprises a variable capacity type hydraulic pump 62 driven by an engine 61, a flow dividing valve 64 disposed in an outlet pipe line 63 of the pump 62 and adapted for dividing a flow of a pressurized hydraulic oil into a flow required for a power steering hydraulic circuit 71 and a balance flow for a cargo handling hydraulic circuit 72, and a flow switching valve 65 with a throttle disposed in the outlet pipe line 63 approaching the flow dividing valve 64 and pilot-operated by a pressure "P3" of the cargo handling hydraulic circuit 72, and a capacity control valve 66 pilot-operated by a differential pressure "P1−P2" between the pressures before and after the flow switching valve 65 and adapted for controlling a capacity varying mechanism 67 of the pump 62. Further, in the proposed hydraulic apparatus, a flow after being throttled by the flow switching valve 65 is set so that it slightly exceeds the flow required for the power steering hydraulic circuit 71.

However, in the proposed hydraulic apparatus described above, the flow switching valve 65 with a throttle adapted for producing the differential pressure "P1−P2" is employed in order to pilot-operate the flow control valve 66 which is adapted for controlling the capacity varying mechanism 67 of the pump 62. Hence, the pressurized hydraulic oil might be subjected to an excessive resistance when it passes through the flow switching valve 65, there might be fear for the pressure loss in the pressurized hydraulic oil accordingly, and eventually there might arise the power loss of the engine 61.

SUMMARY OF THE INVENTION

It is therefore an object of the present invention to enable a pump capacity control which is carried out whenever necessary by detecting the revolution fluctuations of a pump driven by an engine and by detecting whether the cargo handling operation is under way or not, and at the same time to avoid the pressure loss in the pressurized hydraulic oil as much as possible.

In order to achieve the object, a hydraulic apparatus for an industrial vehicle according to the present invention employs a novel arrangement, which comprises:

a variable capacity type hydraulic pump driven by an engine;

a flow dividing valve disposed in an outlet pipe line of the pump and adapted for dividing a flow of a pressurized hydraulic oil into a flow required for a power steering hydraulic circuit and a balance flow for a cargo handling hydraulic circuit;

a switching valve pilot-operated by a pressure of the cargo handling hydraulic circuit and adapted for selecting a supply pilot pressure between a pressure of the power steering hydraulic circuit downstream with respect to the flow dividing valve and a pressure of the outlet pipe line upstream with respect to the flow dividing valve; and a capacity control valve pilot-operated by a differential pressure between the supply pilot pressure and the pressure of the outlet pipe line and adapted for controlling a capacity varying mechanism of the pump.

In the hydraulic apparatus according to the present invention, when the cargo handling operation is not under way and when no operation load is applied to a cargo handling actuator, the switching valve supplies the pressure of the power steering hydraulic circuit as the supply pilot pressure to the capacity control valve. Hence, the capacity control valve is operated to hold a predetermined position by a differential pressure between the pressure of the power steering hydraulic circuit and the pressure of the outlet pipe line. Thus, an increase or decrease in the discharge flow of the pump, which depends on the revolution fluctuations of the engine, works immediately on the capacity varying mechanism through the capacity control valve while accompanied by the change by the differential pressure. Accordingly, the discharge flow for every one revolution of the pump is adjusted automatically, and the discharge flow is maintained stably. In the cargo handling hydraulic circuit, a cargo handling control valve is provided so as to drain the hydraulic oil to an oil tank when the cargo handling operation is not under way, and to introduce the hydraulic oil to the cargo handling actuator when the cargo handling operation is carried out. Hence, the pressure of the hydraulic oil is maintained at a predetermined value in a pipe line connected to the cargo handling hydraulic circuit, and the pressure is increased as the operation load is applied to the cargo handling actuator.

Under the circumstance described above, when the cargo handling operation is get started and when the pilot pressure of the cargo handling hydraulic circuit is increased by the operation load of the cargo handling actuator, the switching valve supplies the pressure of the outlet pipe line as the supply pilot pressure to the capacity control valve. Accordingly, the differential pressure having been applied to the capacity control valve is canceled. Hence, the capacity varying mechanism is operated greatly by the displacement of the capacity control valve in which the equilibrium is lost. As a result, the discharge flow for every one revolution of the pump is increased to the maximum extent.

In the above-described manner, the switching valve selectively supplies either the pressure of the power steering hydraulic circuit or the pressure of the outlet pipe line as the supply pilot pressure to the capacity control valve, and the capacity control valve is pilot-operated by the differential pressure between the supply pilot pressure and the pressure of the outlet pipe line. Therefore, the switching valve itself does not require a throttle for producing a differential pressure, and the excessive resistance can be eliminated, excessive resistance which might be applied to the hydraulic oil when it passes through the flow switching valve 65 with a throttle of the proposed hydraulic apparatus.

In the hydraulic apparatus according to the present invention, the switching valve is pilot-operated so as to selectively supply either the pressure of the power steering hydraulic circuit or the pressure of the outlet pipe line as the supply pilot pressure to the capacity control valve, and the capacity control valve is pilot-operated by the differential pressure between the supply pilot pressure and the pressure of the outlet pipe line. Therefore, it is possible to carry out a pump capacity control whenever necessary by detecting the revolution fluctuations of a pump driven by an engine and by detecting whether the cargo handling operation is under way or not, and at the same time it is possible to avoid the pressure loss in the pressurized hydraulic oil as much as possible.

Thus, the hydraulic apparatus according to the present invention can not only inhibit the power loss from happening and improve the fuel consumption, but also it can inhibit the oil temperature from increasing very effectively. As a result, the sealing members are freed from the thermal degradation. Therefore, the present invention contributes to stabilize a hydraulic apparatus for an industrial vehicle for a long period of service greatly.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure:

FIGS. 1 through 6 illustrates a Preferred Embodiment of a hydraulic apparatus according to the present invention, wherein:

FIG. 1 is a hydraulic circuit diagram of the Preferred Embodiment;

FIG. 2 is a cross sectional view of a variable capacity type hydraulic pump of the Preferred Embodiment;

FIG. 3 is a cross sectional view of a flow dividing valve and a switching valve of the Preferred Embodiment taken in the direction of line A—A of FIG. 2;

FIG. 4 is another cross sectional view of a flow dividing valve and a switching valve of the Preferred Embodiment taken in the direction of line A—A of FIG. 2;

FIG. 5 is a cross sectional view of a capacity control valve of the Preferred Embodiment;

FIG. 6 is a cross sectional view of a flow dividing valve and a switching valve of a modified version of the Preferred Embodiment taken in the direction of line A—A of FIG. 2.

DETAILED DESCRIPTION OF THE PREFERRED EMBODIMENTS

Having generally described the present invention, a further understanding can be obtained by reference to the specific preferred embodiment which is provided herein for purposes of illustration only and is not intended to limit the scope of the appended claims.

The Preferred Embodiment of a hydraulic apparatus for an industrial vehicle according to the present will be hereinafter described with reference to the drawings.

Figure 1:
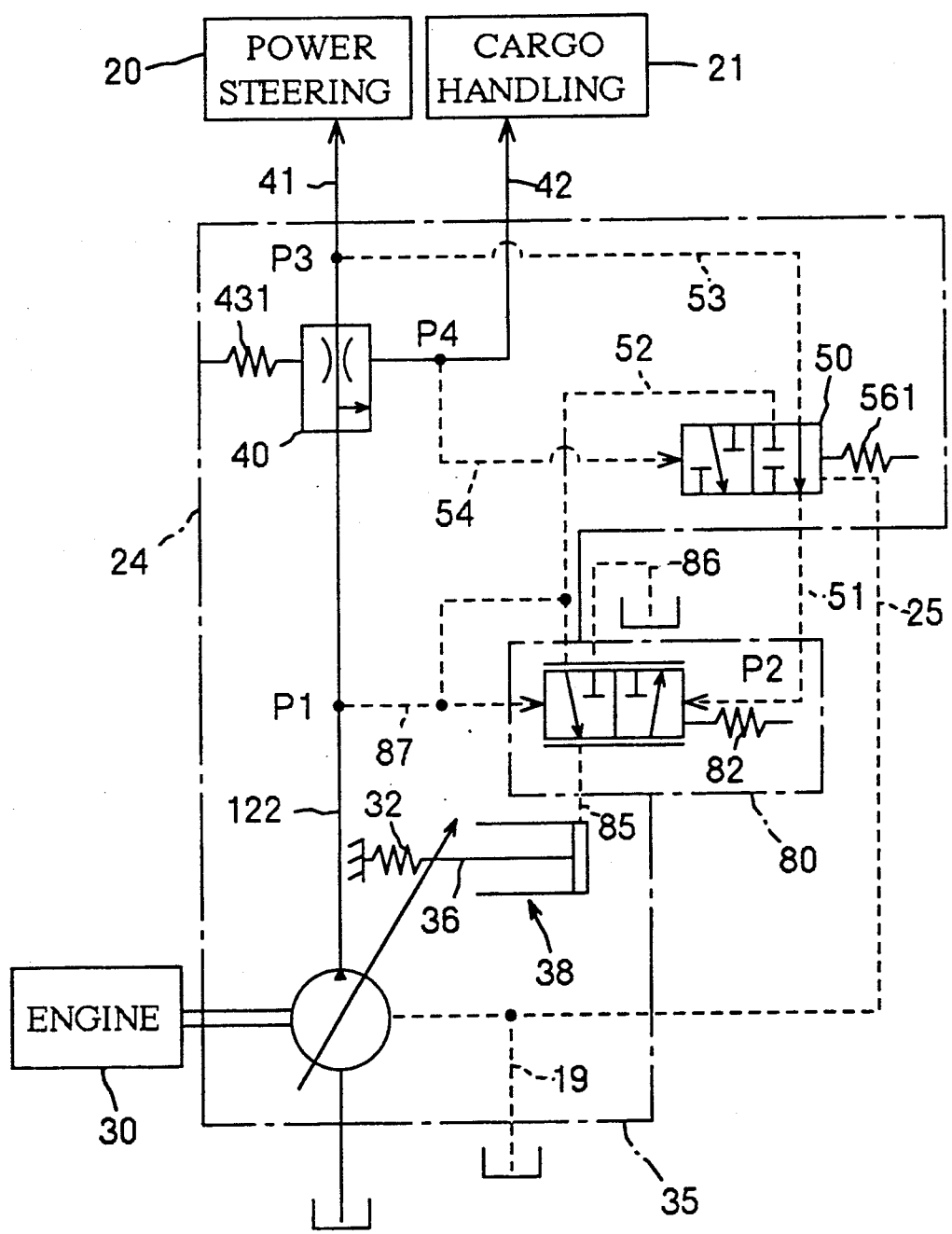

FIG. 1 illustrates a major portion of a hydraulic apparatus to which the present invention is applied. As for a variable capacity type hydraulic pump 35 driven by an engine 30, a swash plate type axial piston pump (hereinafter simply referred to as the pump 35) is employed.

Figure 2:
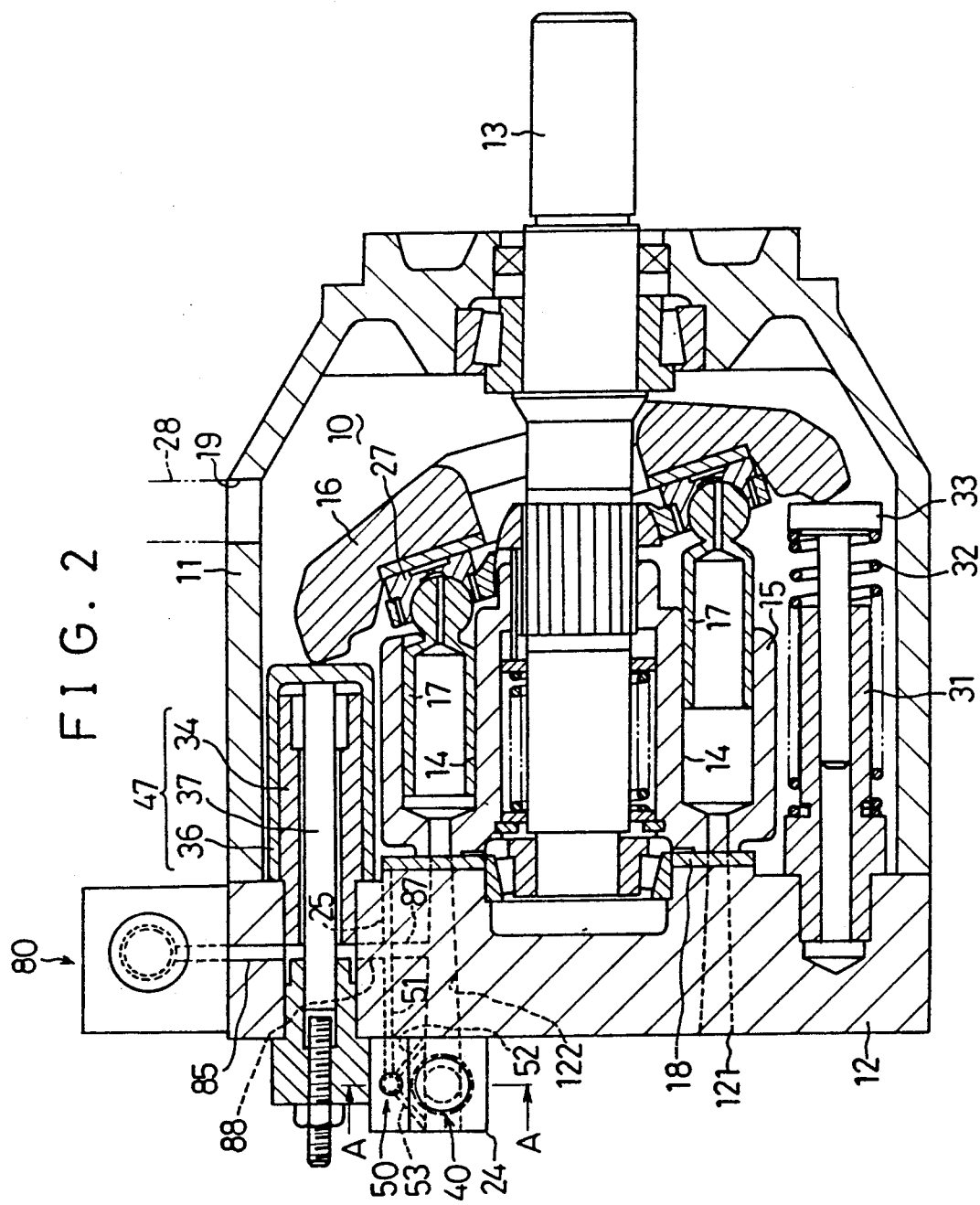

As illustrated in FIG. 2, the pump 35 includes a driving shaft 13. The driving shaft 13 is detachably and rotatably held in an enclosed space 10 by way of bearings. The enclosed space 10 is formed with a casing 11 and an end cover 12.

Further, the driving shaft 13 is engaged with a cylinder block 15 with a spline. The cylinder block 15 has a plurality of bores 14, and is engaged with the driving shaft 13 in a manner being displacable in the axial direction of the driving shaft 13. Furthermore, a swash plate 16 is rotatably and swingably held on the casing 11 by a member not shown, and pistons 17 are accommodated in the bores 14 of the cylinder block 15. The pistons 17 are engaged with the swash plate 16 by way of shoes 27 in a manner being movable back and forth. The shoes 27 are engaged with the swash plate 16.

The end cover 12 is provided with a guide cylinder 31 protruding therefrom. An urging rod 33 is inserted slidably into the guide cylinder 31, and is brought into contact with the swash plate 16 by a spring 32. Further, at an axially symmetrical position with respect to the guide cylinder 31 on the end plate 12, a control cylinder 38 is installed. The control cylinder 38 includes a support cylinder 34 fixed in the end plate 12, an operating member 36 brought into contact with the swash plate 16, and a regulating rod 37 inserted into the support cylinder 34 and adapted for regulating the movable range of the operating member 36. In addition, a capacity control valve 80 is fixed on an outer peripheral surface of the end cover 12, and will be described later in detail.

Figure 5:
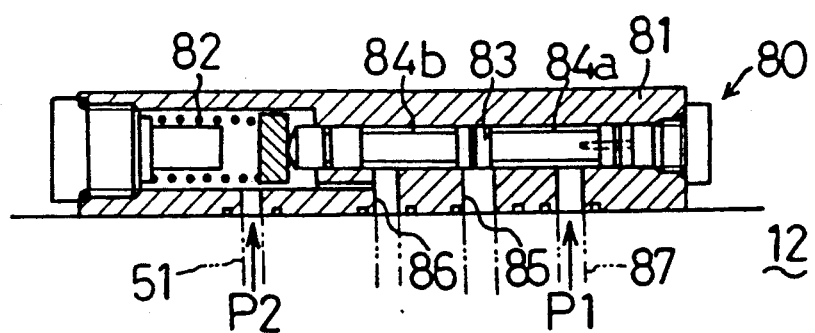

Moreover, an inlet port 121 and an outlet port 122 are formed in the end cover 12, and communicate with the bores 14 by way of a valve plate 18. Also, a pilot port 87, a port 85 and a drain port 86 (Not shown in FIG. 2, see FIG. 5.) are formed between the end cover 12 and the capacity control valve 80. The pilot port 87 communicates with the outlet port 122. The port 85 communicates with the space between the support cylinder 34 and the operating member 36. The drain port 86 communicates with an oil tank (not shown) by way of a drain pipe line. These ports 85 through 87 are also illustrated in FIG. 5 in detail. Similarly, a supply pilot port 51 of the capacity control valve 80 communicates with a switching valve 50 (described later in detail) by way of a pilot pipe line as illustrated in FIG. 1. In addition, as illustrated in FIG. 2, a drain port 19 is drilled through the casing 11 at an upper right portion in FIG. 2 in order to return an excessive hydraulic oil in the enclosed space 10 to the oil tank, and communicates therewith by way of a drain pipe line 28.

FIG. 5 illustrates the construction of the capacity control valve 80 in detail. Namely, in a valve main body 81, a spool 83 is disposed, and controlled by the equilibrium between a differential pressure and the urging force of a spring 82. The differential pressure results from pressures transmitted by way of the pilot port 87 and the supply pilot port 51. On the spool 83, a cut-off 84a and a cut-off 84b are formed. The cut-off 84a is adapted for introducing an outlet port pressure "P1" (i.e., the pressure of the outlet pipe line) into the port 85. The outlet port pressure "P1" arrives at the capacity control valve 80 by way of the outlet port 122 and the pilot port 87. The cut-off 84b is adapted for connecting the port 85 with the drain port 86. Thus, the outlet port pressure "P1" is reduced and introduced into the control cylinder 38 when the pressurized hydraulic oil flows into the port 85. As a result, as illustrated in FIG. 2, the operating member 36 operates while being guided by the support cylinder 34, equilibrium is attained between the urging forces of the operating member 36 and the spring 32, and thereby the pump 35 varies the inclination angle of the swash plate 16.

Figure 3:
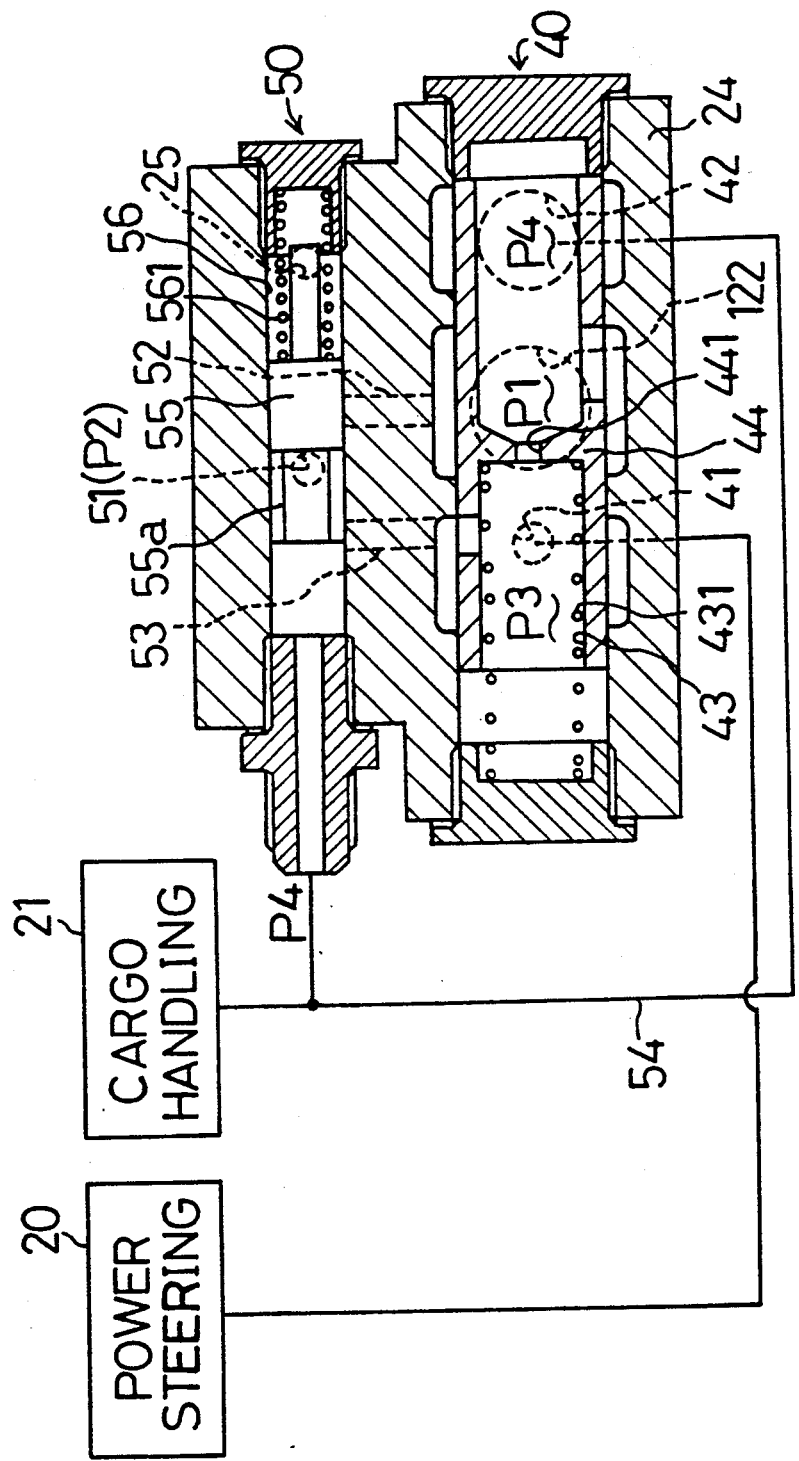
Figure 4:
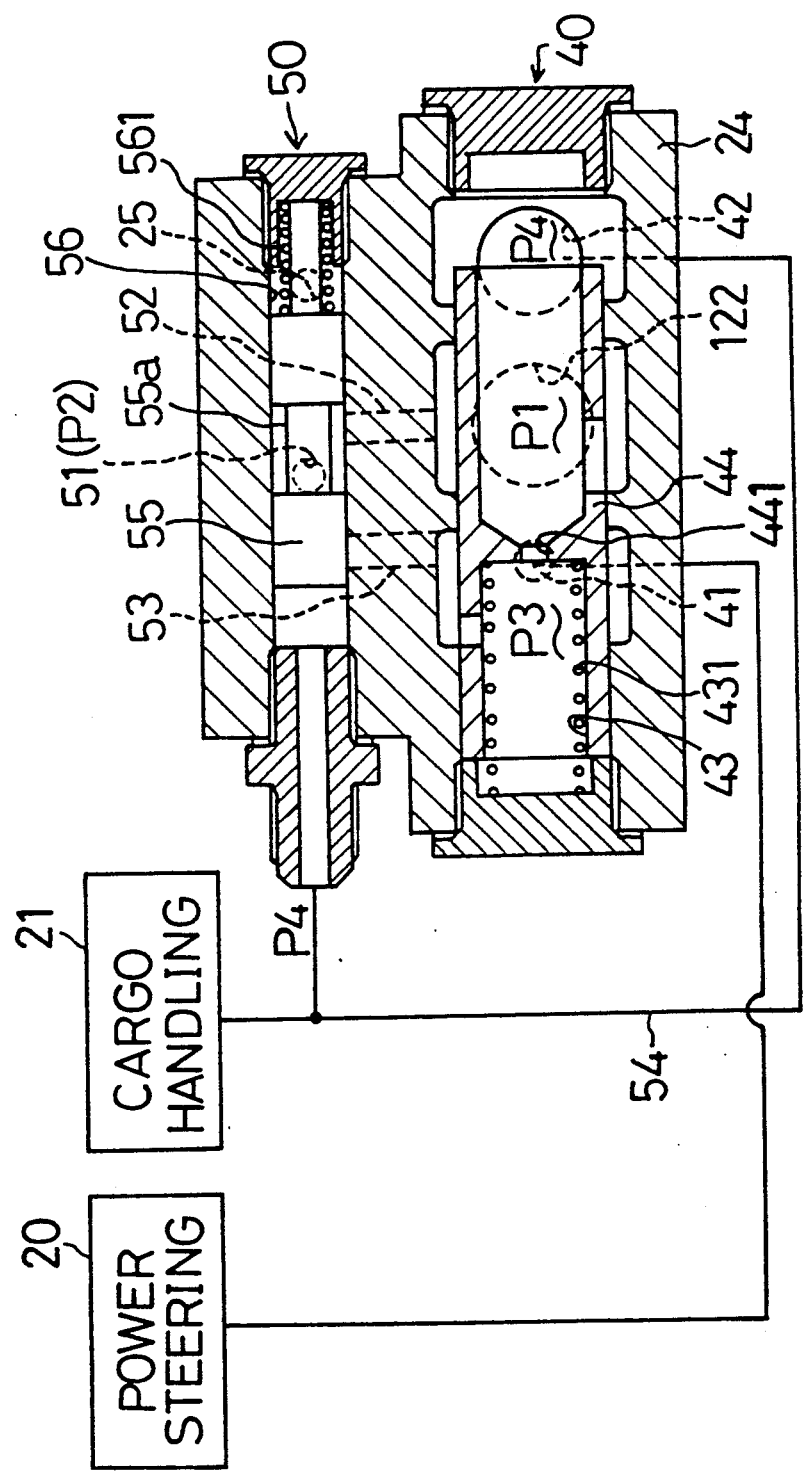

One of the characteristic constructions of the Preferred Embodiment is that the flow dividing valve 40 and the switching valve 50 are integrally assembled in an outlet flange 24 fixed on the end cover 12 of the pump 35. Namely, as illustrated in FIGS. 3 and 4, in a valve main body formed integrally with the outlet flange 24, a spool 44 working as the flow dividing valve 40 is disposed, and controlled by the equilibrium between the outlet port pressure "P1" and the urging force of a compression spring 431. The outlet port pressure "P1" is transmitted by way of the outlet port 122. On a left-hand side with respect to a throttle 441 of the spool 44 in FIGS. 3 and 4, namely on a side of a spring chamber 43, a PS port 41 is formed so as to supply the pressurized hydraulic oil to the power steering hydraulic circuit 20, and, on an opposite side with respect to the spring chamber 43, a cargo handling port 42 is formed in order to supply a balance flow of the pressurized hydraulic oil to the cargo handling hydraulic circuit 21.

Further, an outlet pilot port 52 and a PS pilot port 53 are formed in the same valve main body. The outlet pilot port 52 is adapted for letting out the outlet port pressure "P1," and the PS pilot port 53 is adapted for letting out a PS pilot port pressure "P3" in the spring chamber 43. Furthermore, in the same valve main body, a spool 55 working as the switching valve 50 is disposed, and controlled by the equilibrium between a cargo handling pilot pressure "P4" and the urging force of a compression spring 561. The cargo handling outlet pressure "P4" is transmitted by way of a pilot pipe line 54. The spool 55 communicates with the above-described cargo handling port 42 by way of the pilot pipe line 54, and includes a cut-off 55a adapted for selecting between the outlet port pressure "P1" and the PS pilot pressure "P3" and adapted for supplying the selected pressure as the supply pilot pressure "P2" to the capacity control valve 80 by way of the supply pilot port 51. Moreover, a spring chamber 56 adapted for accommodating the compression spring 561 communicates with the enclosed space 10 of the pump 35 by way of a drain port 25. Additionally, the cargo handling hydraulic circuit 21 communicates with a cargo handling actuator such as a lifting cylinder, a tilting cylinder and the like by way of a cargo handling control hydraulic valve (not shown).

In the above-described construction, when the cargo handling operation is not under way and when no operation load is applied to the cargo handling actuator, the cargo handling pilot pressure "P4" is set at an extremely low value of not more than 20 kgf/cm$^2$. Accordingly, in the switching valve 50, the spool 55 is held at the position illustrated in FIG. 3 by the urging force of the compression spring 561, and the pressurized hydraulic oil coming from the PS pilot port 53 flows to the supply pilot port 51 by way of the cut-off 55a. Eventually, the PS pilot pressure "P3" is let out as the supply pilot pressure "P2" to the capacity control valve 80 illustrated in FIG. 5. Hence, in the capacity control valve 80, the differential pressure, between the supply pilot pressure "P2" (i.e., the PS pilot pressure "P3") and the outlet port pressure "P1," and the urging force of the compression spring 82 are applied to the spool 83 in an opposing manner, and accordingly the spool 83 is held at the position illustrated in FIG. 5. Thus, the outlet port pressure "P1" is reduced while flowing through the cut-off 84a and the port 85 illustrated in FIG. 5, the reduced outlet port pressure "P1" is applied to the space between the operating member 36 and the support cylinder 34 of the control cylinder 38 illustrated in FIG. 2, and thereby the operating member 36 is advanced quickly against the urging force of the spring 32 which is transmitted by way of the swash plate 16. Therefore, the inclination angle of the swash plate 16 varies, thereby reducing the discharge flow for every one revolution of the pump 35 and maintaining a predetermined discharge flow. The cargo handling pilot pressure "P4" is set at not more than 20 kgf/cm$^2$ in the cargo handling port 42 when the cargo handling operation is not under way, because there is provided the cargo handling control valve (not shown) in the cargo handling hydraulic circuit 21. The cargo handling control valve is adapted for draining the hydraulic oil to the oil tank when the cargo handling operation is not under way, and for introducing the hydraulic oil to the cargo handling actuator when the cargo handling operation is carried out. Hence, the cargo handling pilot pressure "P4" is maintained at the predetermined value when the cargo handling operation is not under way, and the cargo handling pilot pressure "P4" is increased as the operation load is applied to the cargo handling actuator as described below.

Under the circumstance described above, when an operator operates a cargo handling lever to start the cargo handling operation, the cargo handling pilot pressure "P4" is increased to 20 kgf/cm² or more. Accordingly, in the switching valve 50, the spool 55 is moved from the position illustrated in FIG. 3 to the position illustrated in FIG. 4 against the urging force of the compression spring 561, and the pressurized hydraulic oil coming from the outlet pilot port 52 flows to the supply pilot port 51 by way of the cut-off 55a. Eventually, the outlet port pressure "P1" is let out as the supply pilot pressure "P2" to the capacity control valve 80 illustrated in FIG. 5. Hence, in the capacity control valve 80, the both of the pressures acting on the spool 83 in an opposing manner become the outlet port pressure "P1," the above-described equilibrium is lost, and thereby the spool 83 is moved by the urging force of the spring 82 in the right direction in FIG. 5. Thus, the space between the operating member 36 and the support cylinder 34 of the control cylinder 38 illustrated in FIG. 2 communicates with the drain port 86 by way of the port 85 and the cut-off 84b, and thereby the operating member 36 loses the support of the hydraulic force. Accordingly, the operating member 36 is retracted quickly while yielding to the urging force of the spring 32 which is transmitted by way of the swash plate 16. Therefore, the inclination angle of the swash plate 16 varies to the enlarging side, thereby increasing the discharge flow for every one revolution of the pump to the maximum extent.

In the above-described manner, the switching valve 50 is disconnected from the main hydraulic circuit, and the PS pilot pressure "P3" and the outlet port pressure "P1" are selected and made into the supply pilot pressure "P2." Then, the supply pilot pressure "P2" is supplied to the capacity control valve 80, and the capacity control valve 80 is pilot-operated by the differential pressure between the PS pilot pressure "P3" and the outlet port pressure "P1" thus selected. Hence, no resistance is applied to the pressurized hydraulic oil by the switching valve 50.

Further, since the flow dividing valve 40 and the switching valve 50 are integrally assembled in the outlet flange 24 of the pump 35, no pipe line is required to connect the flow dividing valve 40 and the switching valve 50.

Furthermore, in the above-described hydraulic apparatus, since the enclosed space 10 of the pump 35 communicates with the spring chamber 56 of the switching valve 50 by way of the drain port 25, the pressurized hydraulic oil leaked into the spring chamber 56 can be returned through the drain port 25 to the oil tank by way of the enclosed space 10 of the pump 35. Thus, number of pipes in the drain pipe line can be reduced by one substantially.

Moreover, since the amount of the hydraulic oil circulating in the enclosed space 10 is increased with this construction, the worn-out particles resulting from the sliding units such as the swash plate 16, the shoes 27 and the like in the pump 35 can be removed at an increased speed, and the extra cooling effect to these sliding units can be obtained.

Figure 6:
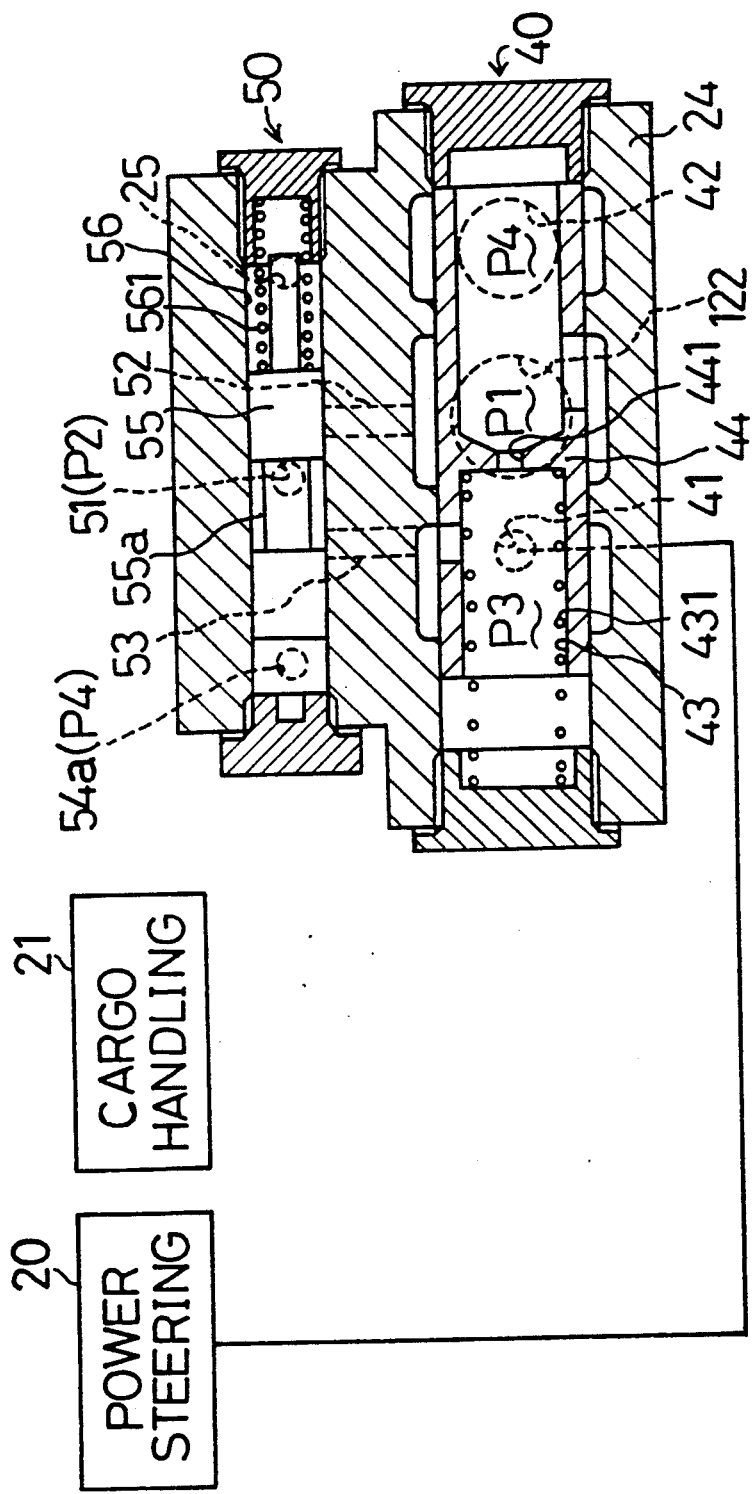
Figure 7:
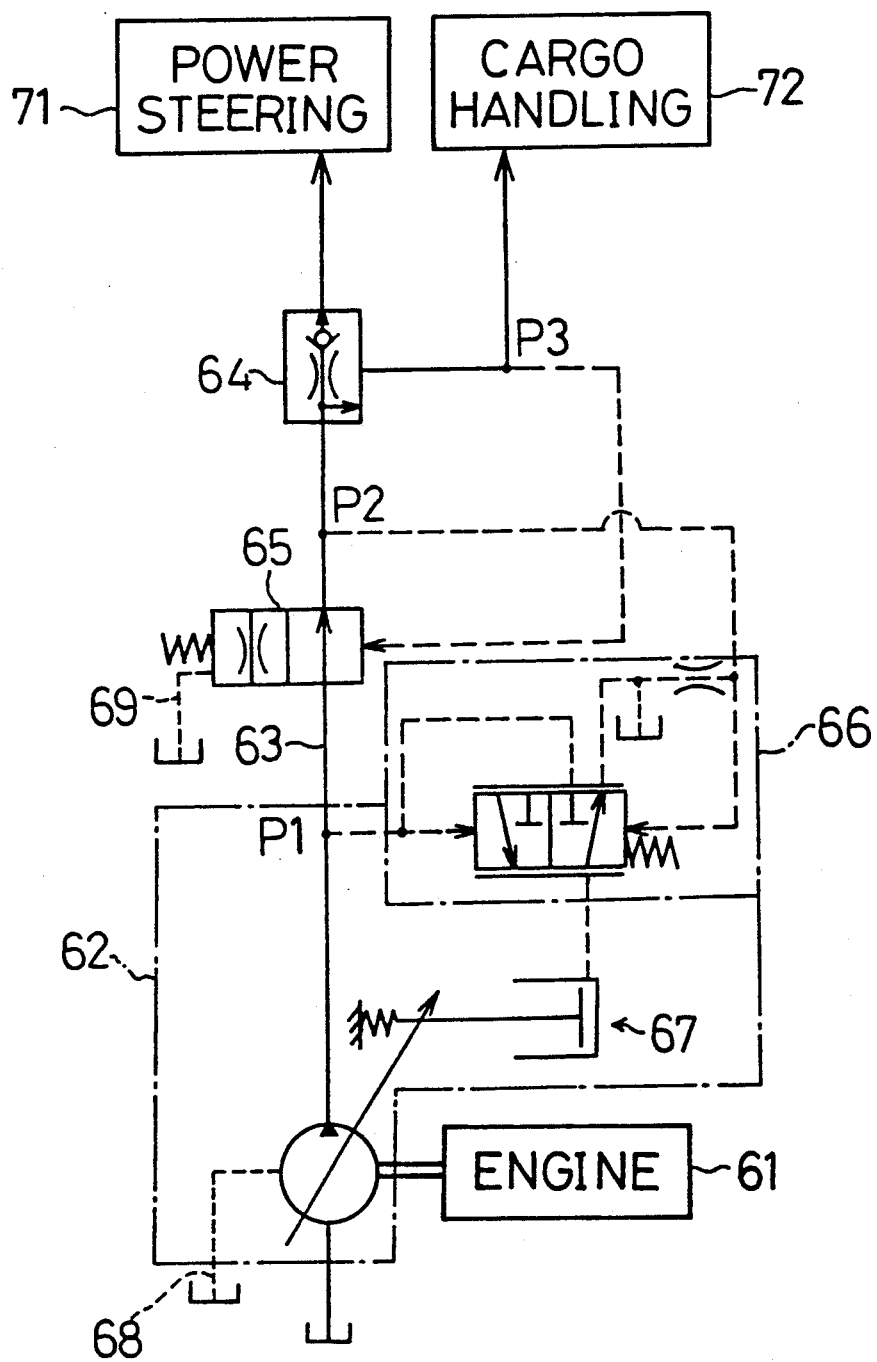
FIG. 7 is a hydraulic circuit diagram of the hydraulic apparatus proposed in advance in Japanese Patent Application No. 222331/1989.

In addition, in the Preferred Embodiment described above, the cargo handling pilot pressures "P4" is applied to the spool 55 of the switching valve 50 by way of the pilot pipe line 54. However, as illustrated in FIG. 6, the cargo handling port 42 can directly communicate with a chamber on the left end side of the spool 55 by way of a port 54a as in a modified version of the Preferred Embodiment. With this construction, even the pilot pipe line 54 can be got rid of.

Having now fully described the present invention, it will be apparent to one of ordinary skill in the art that many changes and modifications can be made thereto without departing from the spirit or scope of the present invention as set forth herein including the appended claims.

What is claimed is:

1. A hydraulic apparatus for an industrial vehicle, comprising:
   a variable capacity type hydraulic pump driven by an engine;
   a flow dividing valve disposed in an outlet pipe line of said pump and adapted for dividing a flow of a pressurized hydraulic oil into a flow required for a power steering hydraulic circuit and a balance flow for a cargo handling hydraulic circuit;
   a switching valve pilot-operated by a pressure of said cargo handling hydraulic circuit and adapted for selecting a supply pilot pressure between a pressure of said power steering hydraulic circuit downstream with respect to said flow dividing valve and a pressure of said outlet pipe line upstream with respect to said flow dividing valve; and
   a capacity control valve pilot-operated by a differential pressure between said supply pilot pressure and said pressure of said outlet pipe line and adapted for controlling a capacity varying mechanism of said pump.

2. The hydraulic apparatus for an industrial vehicle according to claim 1, wherein said flow dividing valve further includes an urging member, and is controlled by equilibrium between said pressure of said outlet pipe line and an urging force of the urging member.

3. The hydraulic apparatus for an industrial vehicle according to claim 1, wherein said switching valve further includes an urging member, and is controlled by equilibrium between said pressure of said cargo handling hydraulic circuit and an urging force of the urging member.

4. The hydraulic apparatus for an industrial vehicle according to claim 1, wherein said capacity control valve further includes an urging member, and is controlled by equilibrium among said supply pilot pressure, said pressure of said outlet pipe line and an urging force of the urging member.

5. The hydraulic apparatus for an industrial vehicle according to claim 1, wherein said variable capacity type hydraulic pump includes said flow dividing valve and said switching valve which are disposed integrally with said variable capacity type hydraulic pump.

6. The hydraulic apparatus for an industrial vehicle according to claim 5, wherein said flow dividing valve and said switching valve are disposed integrally in a valve main body, and the valve main body is disposed integrally with said variable capacity type hydraulic pump.

7. The hydraulic apparatus for an industrial vehicle according to claim 6, wherein said flow dividing valve includes a first port communicating with said power steering hydraulic circuit, a second port communicating with said cargo handling hydraulic circuit and a third port communicating with an outlet port of said variable capacity type hydraulic pump, and said switching valve includes a first pilot port communicating with the first port of said flow dividing valve, a second pilot port communicating with said third port of said flow dividing valve and a third pilot port communicating with said capacity control valve.

8. The hydraulic apparatus for an industrial vehicle according to claim 7, wherein said pressure of said cargo handling hydraulic circuit is transmitted from said third port of said flow dividing valve to said switching valve by way of a pipe line.

9. The hydraulic apparatus for an industrial vehicle according to claim 7, wherein said pressure of said cargo handling hydraulic circuit is transmitted from third port of said flow dividing valve to said switching valve by way of a port formed in said valve main body.

10. The hydraulic apparatus for an industrial vehicle according to claim 1, wherein said capacity control valve is disposed integrally with said variable capacity type hydraulic pump.

11. The hydraulic apparatus for an industrial vehicle according to claim 1, wherein said switching valve further communicates with an enclosed space of said variable capacity type hydraulic pump, thereby draining an excessive hydraulic oil to the enclosed space of said pump.

12. The hydraulic apparatus for an industrial vehicle according to claim 1, wherein said variable capacity type hydraulic pump is a swash plate type axial piston pump.

* * * * *